US012683912B2

(12) United States Patent
Zhu et al.

(10) Patent No.: US 12,683,912 B2
(45) Date of Patent: Jul. 14, 2026

(54) MULTI-USER FLEXIBLE ETHERNET FINE GRANULARITY TIME SLOT ALLOCATION METHOD AND APPARATUS

(71) Applicant: ZHEJIANG LAB, Hangzhou (CN)

(72) Inventors: Kainan Zhu, Hangzhou (CN); Yongdong Zhu, Hangzhou (CN); Zhifeng Zhao, Hangzhou (CN); Yuntao Liu, Hangzhou (CN); Shuyuan Zhao, Hangzhou (CN); Chuyu Li, Hangzhou (CN); Bin Yang, Hangzhou (CN)

(73) Assignee: ZHEJIANG LAB, Hangzhou (CN)

( * ) Notice: Subject to any disclaimer, the term of this patent is extended or adjusted under 35 U.S.C. 154(b) by 341 days.

(21) Appl. No.: 18/459,459

(22) Filed: Sep. 1, 2023

(65) Prior Publication Data

US 2024/0333662 A1     Oct. 3, 2024

(30) Foreign Application Priority Data

Mar. 31, 2023     (CN) .......................... 202310333985.9

(51) Int. Cl.
*H04L 47/70*          (2022.01)
(52) U.S. Cl.
CPC .................................. *H04L 47/822* (2013.01)
(58) Field of Classification Search
CPC .................................................... H04L 47/822
USPC ....................................................... 370/458
See application file for complete search history.

(56) References Cited

U.S. PATENT DOCUMENTS

| | | | | |
|---|---|---|---|---|
| 2017/0093757 A1* | 3/2017 | Gareau | .................... | H04J 3/065 |
| 2020/0244383 A1* | 7/2020 | He | ......................... | H04W 56/00 |
| 2022/0021472 A1* | 1/2022 | Stracca | ................. | H04L 1/0041 |
| 2022/0286220 A1* | 9/2022 | Stracca | ................. | H04L 7/0075 |

(Continued)

FOREIGN PATENT DOCUMENTS

| | | |
|---|---|---|
| CN | 106507366 A | 3/2017 |
| CN | 109729591 A | 5/2019 |
| CN | 115499085 A | 12/2022 |

(Continued)

OTHER PUBLICATIONS

Notice Of Allowance(CN202310333985.9); Date of Mailing: May 18, 2023.

(Continued)

*Primary Examiner* — Christopher B Robinson
*Assistant Examiner* — Chong G Kim
(74) *Attorney, Agent, or Firm* — Wiersch Law Group

(57)          ABSTRACT

A multi-user flexible Ethernet fine granularity time slot allocation method and apparatus. The method is specifically: providing two time slot resource allocation and deployment schemes according to user demands, where the first scheme performs time slot allocation based only on an objective of global minimization of jitter of time slot allocated to all the users and can improve resource allocation equity and improve whole performance of a network. The second scheme performs weighted sum of delay and jitter minimization based time slot allocation on each user according to the quantity of time slots required for the users in sequence from large to small on the premise of most user input data in the current time slot assignment period being transmitted in the current time slot assignment period.

9 Claims, 10 Drawing Sheets

(56)        References Cited

U.S. PATENT DOCUMENTS

2024/0146433 A1 *   5/2024   Han  ...................... H04J 3/1658
2025/0184032 A1 *   6/2025   Li  ........................... H04L 47/34

FOREIGN PATENT DOCUMENTS

| WO | 2019169995 A1 | 9/2019 |
| WO | 2020078203 A1 | 4/2020 |
| WO | 2021189994 A1 | 9/2021 |
| WO | 2022021929 A1 | 2/2022 |
| WO | 2022184129 A1 | 9/2022 |

OTHER PUBLICATIONS

First Office Action(CN202310333985.9); Date of Mailing: May 10, 2023.
Timeslot-allocation-algorithm-based-on-multi-objective-optimization mechanical translation).

* cited by examiner

MULTI-USER FLEXIBLE ETHERNET FINE GRANULARITY TIME SLOT ALLOCATION METHOD AND APPARATUS

CROSS-REFERENCE TO RELATED APPLICATIONS

The present application claims priority to Chinese Patent Application No. 202310333985.9, filed on Mar. 31, 2023, the content of which is incorporated herein by reference in its entirety.

TECHNICAL FIELD

The present disclosure relates to the technical field of transport networks, in particular to a multi-user flexible Ethernet fine granularity time slot allocation method and apparatus.

BACKGROUND

A flexible Ethernet (FlexE) technology is a technology developed to meet demands such as high-speed transfer and flexible bandwidth configuration based on a standard Ethernet technology. The FlexE technology introduces a shim layer as one additional logical layer inserted between a media access control layer and a physical layer in a conventional Ethernet architecture, and a core architecture of the FlexE technology is implemented by a time slot distribution mechanism based on time division multiplexing.

In FlexE, many application services each have a strict demand for real-time communication. Predictable and consistent network services, such as a transmission rate, delay and jitter, are basic components of communication service quality in these applications as well as main focuses of a network protocol. In the time slot distribution mechanism based on time division multiplexing, the transmission rate refers to the quantity of time slots allocated to a user. Delay refers to time required for transmitting data from an information source to a receiving end. Jitter refers to change of arrival time of a data packet, and each data packet of a real-time data stream has to complete transmission within a certain time constraint relative to transmission completion time of a previous data packet. The greater the jitter is, the more instable a communication network is. Jitter has prominent influence on multimedia services such as images, audios and videos. For example, excessive jitter may cause discontinuous and unsmooth voice and possibly lead to failure in recognizing voice.

Most of existing time slot distribution mechanisms based on time division multiplexing are for time slot allocation with a single objective of either delay or jitter minimization, making it difficult to ensure the diversified transmission demands of different services. In the meantime, fewer existing time slot distribution mechanisms based on time division multiplexing are for time slot allocation specific to demands for delay and jitter in a multi-user scenario.

After searching the prior art, it is found that an article "TDMA Fixed Time Slot Allocation Algorithm with minimum delay jitter in Tactical Datalink" has been published by Liu Xing, et al. on "Pages 90-94, Volume 30, Issue 6, June, 2012, Systems Engineering", which provides a fixed time slot allocation algorithm based on minimum delay jitter, transforming a tactical datalink time slot uniform allocation problem based on time division multiple access (TDMA) to a problem of finding the shortest path in a directed cyclic graph with the definite number of edges and without a loop in a graph theory and then solving problems by using a dynamic programming method. A patent for application "TDMA communication network time slot uniform allocation method based on minimum delay jitter" (application No. CN201510770651.3) by University of Electronic Science and Technology of China has provided a TDMA communication network time slot uniform allocation method based on minimum delay jitter, that is, a time slot allocation scheme is solved in known available and non-uniformly distributed time slots by using a TDMA communication network protocol as a basis and based on a stochastic state transition theory, so that the minimum delay jitter is achieved. However, the above two technologies have studied specific only to single-user time slot uniform allocation (namely, minimum jitter) without considering a multi-user time slot allocation scenario, a specific user data input time slot, or a delay problem caused by time slot allocation performed specific to the input time slot, and methods proposed by the above two technologies cannot provide a time slot allocation globally optimal solution with minimum jitter under a multi-user scenario.

SUMMARY

For the above defects in the prior art and oriented to diversified demands of multi-user service transmission in FlexE, the present disclosure provides a multi-user flexible Ethernet fine granularity time slot allocation method, in combination with demands of a plurality of users for service transmission rate, delay and jitter, a dynamic edge weight is designed based on a directed graph and a value of weight factor on an optimization objective, and multi-user time slot allocation is performed according to the optimization objective's weight factor of a time slot allocation strategy. Furthermore, when an objective of multi-user time slot allocation is jitter minimization, a multi-user globally optimal time slot allocation method is designed, so as to overcome the defects in the prior art.

In order to achieve the above objectives, the present disclosure provides the following technical scheme.

A multi-user FlexE fine granularity time slot allocation method, includes the following steps:

Step S1: obtaining a current network state of FlexE, including a total quantity of time slots in a current time slot allocation period, a quantity of idle time slots in the current time slot allocation period and positions of the idle time slots in the current time slot allocation period.

Step S2: obtaining a user demand, including the quantity of users to which the time slots need to be allocated and the quantity of time slots required for each user.

Step S3: allocating time slot for the users according to the current network state and the user demand.

Step S4: performing time slot configuration by the FlexE according to a time slot allocation result of the user.

The users have two selective time slot allocation schemes: scheme a) jitter minimization based time slot allocation, including allocating time slot based only on an objective of global minimization of jitter of time slot allocated to all the users, without requiring a delay of the allocated time slots; and scheme b) weighted sum of delay and jitter minimization based time slot allocation for each user in a sequence of the quantity of time slots required for the users from large to small on the premise of most user input data in the current time slot allocation period being transmitted in the current time slot allocation period.

Further, specific sub-steps of the scheme a) jitter minimization based time slot allocation in step S3 are as follows:

Sub-step S31$a$: calculating an optimal time slot interval of each user, respectively, according to the total quantity of time slots in the current time slot allocation period and the quantity of time slots required for each user, a specific calculation method being to divide the total quantity of time slots by the quantity of time slots required for the user, where a result of a u$^{th}$ user is represented by opt$_u$.

Sub-step S32$a$: establishing a directed and edge-weighted graph for each user, respectively, according to the quantity of idle time slots and the positions of idle time slots in the current time slot allocation period and the optimal time slot interval of each user.

Each node in the directed and edge-weighted graph represents one idle time slot, a certain node is represented by x, and a position of the idle time slot corresponding to the node in the current time slot allocation period is represented by loc(x); and a calculation method of a weight on a directed edge connecting two nodes including:

When a position loc(j) of an idle time slot corresponding to an inflow node j connected with the directed edge in the current time slot allocation period is greater than or equal to a position loc(i) of an idle time slot corresponding to an outflow node i connected with the directed edge in the current time slot allocation period, namely loc(j)>loc(i), the weight on the directed edge is obtained by subtracting the position loc(i) of the idle time slot corresponding to the outflow node i connected with the directed edge in the current time slot allocation period and the optimal time slot interval opt$_u$ of the user from the position loc(j) of the idle time slot corresponding to the inflow node j connected with the directed edge in the current time slot allocation period, and dividing a square of an obtained result by the optimal time slot interval opt$_u$ of the user, mathematically represented by (loc(j)−loc(i)−opt$_u$)$^2$/opt$_u$.

When the position loc(j) of the idle time slot corresponding to the inflow node j connected with the directed edge in the current time slot allocation period is less than the position loc(i) of the idle time slot corresponding to the outflow node i connected with the directed edge in the current time slot allocation period, namely loc(j)<loc(i), the weight on the directed edge is obtained by adding the position loc(j) of the idle time slot corresponding to the inflow node j connected with the directed edge in the current time slot allocation period to the total quantity N of time slots in the current time slot allocation period, subtracting the position loc(i) of the idle time slot corresponding to the outflow node i connected with the directed edge in the current time slot allocation period and the optimal time slot interval opt$_u$ of the user, and dividing a square of an obtained result by the optimal time slot interval opt$_u$ of the user, mathematically represented by (loc(j)+N−loc(i)−opt$_u$)$^2$/opt$_u$.

Sub-step S33$a$: establishing an integer linear programming mathematical optimization model in combination with the following three constraint conditions with minimizing global sum of jitter of allocated time slot as an objective, where minimizing a sum of weights corresponding to path cycles of the definite quantity of edges in directed graphs of all users:

(1) A quantity of directed edges flowing into a node on the directed and edge-weighted graph is equal to the quantity of directed edges flowing out of the node.

(2) A node in each directed and edge-weighted graph is allocated to at most one user, at most one edge flows out of the node, and meanwhile, at most one edge flows into the node.

(3) A quantity of nodes allocated to the user meets a demand of the user for the quantity of time slots.

Sub-step S34$a$: solving the established integer linear programming mathematical optimization model by using a branch and bound method to obtain a globally optimal time slot allocation result.

Further, specific sub-steps of the scheme b) on the premise of most user input data in the current time slot allocation period being transmitted in the current time slot allocation period, weighted sum of delay and jitter minimization based time slot allocation is performed on each user according to time slot quantities required for the users in sequence from large to small are as follows:

Sub-step S31$b$: obtaining a position of an input time slot of each user in the current time slot allocation period, and a weight factor a with a delay minimization objective and a weight factor 1−a with a jitter minimization objective.

Sub-step S32$b$: ordering according to the quantity of time slots required for the users from large to small, and allocating the time slots for each user in sequence according to the sequence, where iteratively executing the following sub-step S33$b$ to sub-step S39$b$ for each user in sequence.

Sub-step S33$b$: calculating an optimal time slot interval of a current user u according to the total quantity of time slots in the current time slot allocation period and the quantity of time slots required for the current user u, a specific calculation method being to divide the total quantity of time slots by the quantity of time slots required for the current user u, where a result of the u$^{th}$ user is represented by opt$_u$.

Sub-step S34$b$: calculating a quantity of input time slots of the current user u incapable of transmission in the current time slot allocation period, representing by ntx, and representing an initial value of ntx by ntx_ini.

Sub-step S35$b$: representing the quantity of idle time slots in the current time slot allocation period by m and establishing an m×m adjacent matrix Q$^{(n)}$, where each element $$Q_{i,j}^{(n)}$$

in the adjacent matrix Q$^{(n)}$ represents a sum of weight on a shortest path containing n edges from nodes i to j.

Sub-step S36$b$: calculating a value of an adjacent matrix $$Q_{i,j}^{(1)}:$$

Setting a corresponding value of the adjacent matrix as a null value when i is equal to j.

Calculating a path weight, where an element value of the adjacent matrix $$Q_{i,j}^{(1)}$$

according to a weight calculation method in case of being capable of transmission in the current time slot allocation period when i is not equal to j, a value of ntx is 0 and a position loc(P$_1$) of a first input time slot of the current user u in the current time slot allocation period is less than or equal to a position of the node i in the current time slot allocation period; otherwise, setting a corresponding element value of the adjacent matrix as a null value when the position $\text{loc}(P_1)$ of the first input time slot of the current user u in the current time slot allocation period is greater than the position of the node i in the current time slot allocation period, where input and output time slots cannot match.

Calculating the path weight, where the element value of the adjacent matrix $$Q_{i,j}^{(1)},$$

and setting ntx=ntx−1, according to the weight calculation method in case of being incapable of transmission in the current time slot allocation period by using a position $\text{loc}(P_{k_u-ntx+1})$ of a ntx$^{th}$ last time slot of input time slots of the current user u when i is not equal to j and the value of ntx is greater than 0.

Sub-step S37b: selecting an intermediate node q, whose position in the current time slot allocation period is greater than the position of the node i in the current time slot allocation period and less than a position of the node j in the current time slot allocation period; calculating an adjacent matrix $$Q_{i,j}^{(n)}$$

when n is a value from 2 to (the quantity $k_u$ of time slots required for the current user u minus 1); and an element of the adjacent matrix $$Q_{i,j}^{(n)}$$

means a minimum value of a sum of weight on a shortest path $$Q_{i,q}^{(n-1)}$$

containing (n−1) edges from the node i to the intermediate node q and a weight from the intermediate node q to the node j.

Sub-step S38b: calculating the adjacent matrix $$Q_{i,i}^{(n)}$$

by adding $$Q_{i,q}^{(n-1)}$$

and $$Q_{q,i}^{(1)}$$

when n is a value of the quantity $k_u$ of time slots required for the current user u; and a minimum diagonal element of $$Q_{i,i}^{(n)}$$

is a minimum sum of weight corresponding to a shortest path directed cycle without a loop by passing through $k_u$ edges from the node i to return to the node i;

Sub-step S39b: finding out nodes through which the shortest path directed cycle passes by a value of an adjacent matrix $P^{(n)}$ corresponding to the minimum total weight obtained in S38b, and allocating the time slots corresponding to these nodes to the user u; and Sub-step S40b: updating the quantity of idle time slots in the current time slot allocation period and the positions of idle time slots in the current time slot allocation period.

Further, specific sub-steps of the sub-step S34b: calculating the quantity of input time slots of the current user u which are incapable of transmission in the current time slot allocation period are as follows:

First step: initializing a value of the quantity of input time slots of the current user u incapable of transmission in the current time slot allocation period, where ntx=0, a value of the quantity of input time slots of the current user u which are capable of transmission in the current time slot allocation period, where ctx=0, and an input time slot indicator variable of the current user u, where i=1.

Second step: setting ntx=ntx+1 when a position of an i$^{th}$ last input time slot of the current user u in the current time slot allocation period is greater than a position of a (ctx+1)$^{th}$ last idle time slot in the current time slot allocation period; and setting ctx=ctx+1 when the position of the i$^{th}$ last input time slot of the current user u in the current time slot allocation period is less than or equal to the position of a (ctx+1)$^{th}$ last idle time slot in the current time slot allocation period.

Third step: setting i=i+1 and repeating the second step until a value of i is greater than the quantity of time slots required for the current user u.

Further, specific sub-steps of the sub-step S37b: calculating a value of the weight from the intermediate node q to the node j are as follows:

First step: calculating the value of the weight from the intermediate node q to the node j according to the calculation method capable of transmission in the current time slot allocation period when a value of ntx_ini is equal to 0 and a position of a time slot of the intermediate node q is greater than or equal to a position $\text{loc}(P_a)$ of a time slot of an n$^{th}$ input of the current user u;

Calculating the value of the weight from the intermediate node q to the node j according to a calculation method in case of being incapable of transmission in the current time slot allocation period by a position $\text{loc}(P_{k_u-ntx+1})$ of a ntx$^{th}$ last time slot of input time slots of the current user u and setting ntx=ntx−1 when the value of ntx_ini is greater than 0 and the value of ntx is greater than 0;

Calculating the value of the weight from the intermediate node q to the node j according to the calculation method in case of being capable of transmission in the current time slot allocation period by using a position of a (n−ntx_ini)$^{th}$ input time slot of the current user u when the value of ntx_ini is greater than 0, a value of ntx is equal to 0 and the position of a time slot of the intermediate node q is greater than or equal to a position of a time slot of a $(n-ntx\_ini)^{th}$ input of the current user u; and Second step: establishing the intermediate node q recorded and passed by an m×m adjacent matrix $P^{(n)}$, where $$P_{i,j}^{(n)} = q,$$

indicating that an $n^{th}$ hop from the node i to the node j passes through the node q, and values in $$P_{i,j}^{(1)}$$

are all null values.

Further, specific calculation sub-steps of the sub-step S36b: the weight calculation method in case of being incapable of transmission in the current time slot allocation period are as follows:

First step: calculating a jitter weight.

Representing one node by x, representing a position of an idle time slot corresponding to the node in the current time slot allocation period by loc(x), and a calculation method of the jitter weight on a directed edge connecting two nodes including:

When a position loc(j) of an idle time slot corresponding to an inflow node j connected with the directed edge in the current time slot allocation period is greater than or equal to a position loc(i) of an idle time slot corresponding to an outflow node i connected with the directed edge in the current time slot allocation period, namely loc(j)>loc(i), the weight on the directed edge is obtained by subtracting the position loc(i) of the idle time slot corresponding to the outflow node i connected with the directed edge in the current time slot allocation period and the optimal time slot interval $opt_u$ of the user from the position loc(j) of the idle time slot corresponding to the inflow node j in the current time slot allocation period, dividing a square of the above obtained subtracting result by the optimal time slot interval $opt_u$ of the user and finally multiplying by the weight factor 1-a with a jitter minimization objective, mathematically represented by $(1-a)\times(loc(j)-loc(i)-opt_u)^2/opt_u$; and When the position loc(j) of the idle time slot corresponding to the inflow node j connected with the directed edge in the current time slot allocation period is less than the position loc(i) of the idle time slot corresponding to the outflow node i connected with the directed edge in the current time slot allocation period, where loc(j)<loc(i), the weight on the directed edge is obtained by adding the position loc(j) of the idle time slot corresponding to the inflow node j in the current time slot allocation period to the total quantity N of time slots in the current time slot allocation period, subtracting the position loc(i) of the idle time slot corresponding to the outflow node i connected with the directed edge in the current time slot allocation period and the optimal time slot interval $opt_u$ of the user, dividing a square of the above obtained subtracting result by the optimal time slot interval $opt_u$ of the user and finally multiplying by the weight factor 1-a with the jitter minimization objective, mathematically represented by $(1-a)\times(loc(j)+N-loc(i)-opt_u)^2/opt_u$.

Second step: calculating a delay weight.

Adding a position of an idle time slot corresponding to a current outflow node i in the current time slot allocation period to the total quantity N of time slots in the current time slot allocation period, subtracting a position of a current input time slot of the current user u in the current time slot allocation period, and multiplying the above obtained subtracting result by a weight factor a with the delay minimization objective.

Third step: calculating a total weight, namely adding the jitter weight calculated in the first step and the delay weight calculated in the second step.

Further, specific calculation sub-steps of the sub-steps S36b and S37b: the weight calculation method in case of being capable of transmission in the current time slot allocation period are as follows:

First step: calculating a jitter weight;

Representing one node by x, representing a position of an idle time slot corresponding to the node in the current time slot allocation period by loc(x), and a calculation method of the jitter weight on a directed edge connecting two nodes including:

When a position loc(j) of an idle time slot corresponding to an inflow node j connected with the directed edge in the current time slot allocation period is greater than or equal to a position loc(i) of an idle time slot corresponding to an outflow node i connected with the directed edge in the current time slot allocation period, where when loc(j)>loc(i), the weight on the directed edge is obtained by subtracting the position loc(i) of the idle time slot corresponding to the outflow node i connected with the directed edge in the current time slot allocation period and the optimal time slot interval $opt_u$ of the user from the position loc(j) of the idle time slot corresponding to the inflow node j in the current time slot allocation period, dividing a square of an obtained result by the optimal time slot interval $opt_u$ of the user, and finally multiplying by a weight factor 1-a with a jitter minimization objective, mathematically represented by $(1-a)\times(loc(j)-loc(i)-opt_u)^2/opt_u$.

When the position loc(j) of the idle time slot corresponding to the inflow node j connected with the directed edge in the current time slot allocation period is less than the position loc(i) of the idle time slot corresponding to the outflow node i connected with the directed edge in the current time slot allocation period, where when loc(j)<loc(i), the weight on the directed edge is obtained by adding the position loc(j) of the idle time slot corresponding to the inflow node j in the current time slot allocation period to the total quantity N of time slots in the current time slot allocation period, subtracting the position loc(i) of the idle time slot corresponding to the outflow node i connected with the directed edge in the current time slot allocation period and the optimal time slot interval $opt_u$ of the user, dividing a square of an obtained result by the optimal time slot interval $opt_u$ of the user, and finally multiplying by the weight factor 1-a with the jitter minimization objective, mathematically represented by $(1-a)\times(loc(j)+N-loc(i)-opt_u)^2/opt_u$;

Second step: calculating a delay weight.

Subtracting a position of a current input time slot of the current user u in the current time slot allocation period from a position of an idle time slot corresponding to a current outflow node in the current time slot allocation period, and multiplying an obtained result by a weight factor a with the delay minimization objective.

Third step: calculating a total weight, namely adding the jitter weight calculated in the first step and the delay weight calculated in the second step.

A multi-user flexible Ethernet fine granularity time slot allocation apparatus is configured to implement a multi-user flexible Ethernet fine granularity time slot allocation method.

An electronic device, including:

One or more processors.

A storage apparatus, configured to store one or more programs, the one or more programs, when executed by the electronic device, causing the electronic device to implement a multi-user flexible Ethernet fine granularity time slot allocation method.

A computer-readable storage medium is provided, storing a program, the program, when executed by a processor, implementing a multi-user flexible Ethernet fine granularity time slot allocation method.

Beneficial effects of the present disclosure are:

(1) The present disclosure provides the multi-user flexible Ethernet fine granularity time slot allocation method and apparatus, which can achieve the purposes of flexibly, rapidly and dynamically adjusting, allocating and deploying network time slot resources according to a current network state and user demands in a multi-user scenario. In an embodiment, two time slot resource allocation and deployment schemes are provided according to the user demands. The first scheme performs time slot allocation based only on an objective of global jitter minimization of time slots allocated to all the users and can improve resource allocation equity and improve whole performance of a network. The second scheme performs weighted sum of delay and jitter minimization based time slot allocation on each user according to the quality of time slots required for the users in sequence from large to small on the premise of most user input data in the current time slot allocation period being transmitted in the current time slot allocation period.

(2) The multi-user flexible Ethernet fine granularity time slot allocation method and apparatus provided by the present disclosure are low in complexity and can meet diversified transmission demands of different users, implement flexible, rapid and dynamic adjustment and allocation of time slot resources and remarkably improve transmission performance of the network.

BRIEF DESCRIPTION OF DRAWINGS

FIG. 1 is a schematic diagram of a multi-user directed graph in scheme a.

FIG. 2 is a block diagram of steps of a time slot allocation algorithm of a whole scheme a.

FIG. 8 is a diagram of distribution of time slot positions of 100 idle time slots generated randomly when the total quantity of time slots is 480 in scheme a.

FIG. 9 is a diagram of distribution of time slot positions of 300 idle time slots generated randomly when the total quantity of time slots is 480 in scheme b.

10

Figure 10:
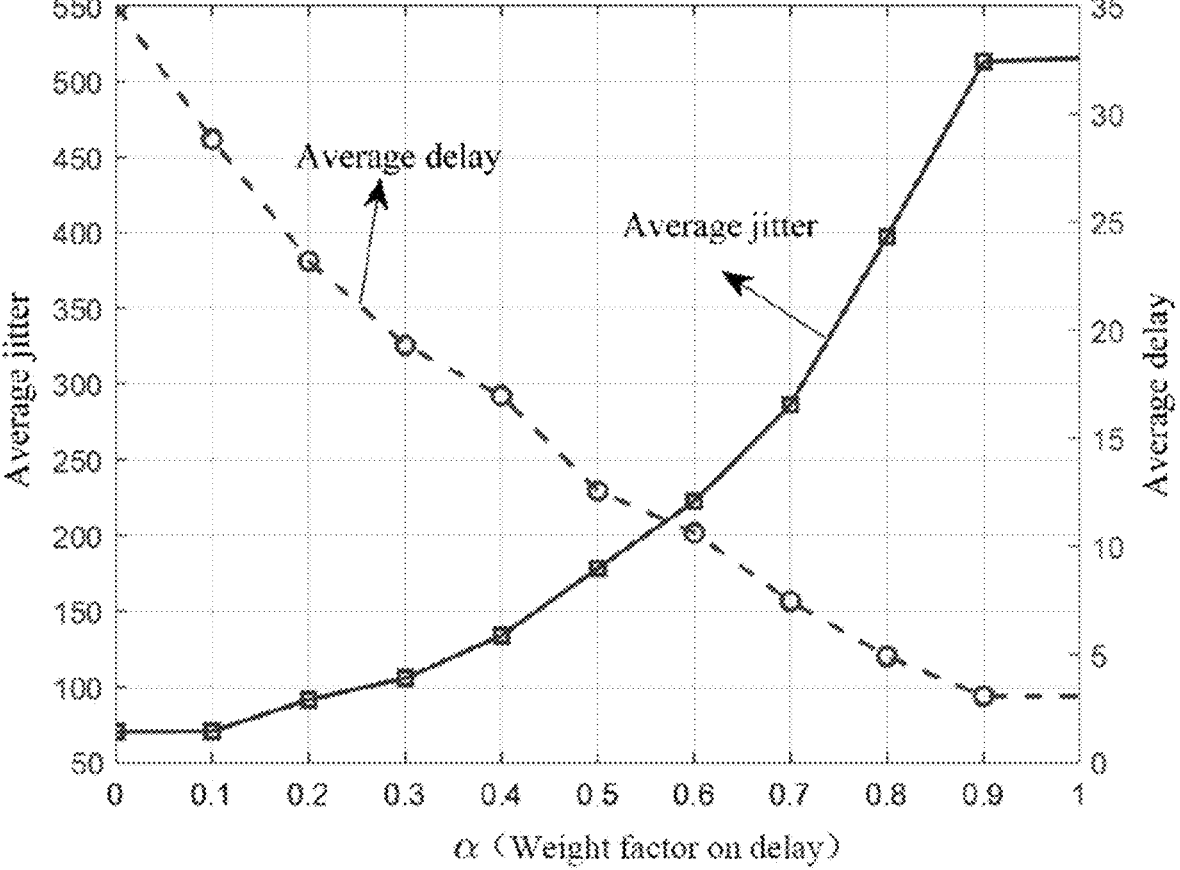

FIG. 10 is a diagram of a relationship among user overall average jitter, delay and a weight factor on delay in scheme b.

DESCRIPTION OF EMBODIMENTS

To make the objectives, technical solutions, and advantages of the present disclosure clearer, the following further describes the present disclosure in detail with reference to the accompanying drawings and embodiments. However, it is to be understood that specific embodiments described here are merely for explaining the present disclosure instead of limiting the scope of the present disclosure. Besides, in the following description, description of known structures and technologies is omitted to avoid unnecessary concepts confusing the present disclosure.

An embodiment includes the following steps.

Step 1: a current network state of FlexE is obtained, which includes the total quantity N of time slots in a current time slot allocation period, the quantity m of idle time slots in the current time slot allocation period and positions $S=\{S_1, \ldots, S_m\}$ of the idle time slots in the current time slot allocation period.

Step 2: a user demand is obtained, which includes the quantity |U| of users to which time slots need to be allocated and the quantity (the quantity of time slots required for an $u^{th}$ user is represented by $k_u$) of time slots required for each user.

Step 3: time slot allocation is performed for the user according to the current network state and the user demand. In an embodiment, two time slot allocation schemes for selection by the user are included.

Scheme a) jitter minimization based time slot allocation, including time slot allocation based only on an objective of global minimization of jitter of time slot allocated to all the users, without requiring for delay of allocated time slots.

Scheme b) performs weighted sum of delay and jitter minimization based time slot allocation for each user according to the quantity of time slots required for the users in sequence from large to small on the premise of most user input data in the current time slot allocation period being transmitted in the current time slot allocation period.

Step 4: time slot configuration is performed by FlexE according to a user time slot allocation result.

Scheme a):

Scheme a) is given below: jitter minimization based time slot allocation, and in case on premise of allocating the time slots based only on an objective of global minimization of jitter of the time slots allocated to all the users, an algorithm executing process is as follows:

First step: an optimal time slot interval $opt_u$ (representing an optimal time slot interval of a $u^{th}$ user) of each user is calculated according to the total quantity N of time slots in the current time slot allocation period and the quantity $k_u$(representing the quantity of time slots required for the $u^{th}$ user) of time slots required for each user, where a specific calculation method is represented as follows:

$$opt_u = N / k_u$$

In order to guarantee minimum sum of jitter of allocated time slot, an optimal time slot allocation scheme needs to be figured out, such that a time slot interval sequence Di between adjacent time slots allocated to the user approaches $opt_u$ as much as possible, where an optimal object may be represented by:

$$\min \sigma = \sum_{i=1}^{k_u} \frac{(D_i - opt_u)^2}{opt_u}$$

Second step: a directed and edge-weighted graph is established for each user according to the quantity m of idle time slots and positions of idle time slots $S=\{S_1, \ldots, S_m\}$ in the current time slot allocation period and the optimal time slot interval $opt_u$ of each user. Each node in the directed and edge-weighted graph represents an idle time slot, a certain node is represented by x, and a position of an idle time slot corresponding to the node in the current time slot allocation period is represented by loc(x).

An outflow node of a directed edge is represented by i, an inflow node of the directed edge is represented by j, positions of idle time slots corresponding to the nodes i and j in the current time slot allocation period are represented by loc(i) and loc(j) respectively, and a calculation formula of a weight $$w_{i,j}^u$$

of the two nodes i and j on the directed edge connected with the $u^{th}$ user is shown as follows:

$$w_{i,j}^u = \begin{cases} \dfrac{(loc(j) - loc(i) - opt_u)^2}{opt_u}, \forall \, loc(i) \le loc(j) \\ \dfrac{(loc(j) + N - loc(i) - opt_u)^2}{opt_u}, \forall \, loc(i) > loc(j) \end{cases}$$

Figure 1:
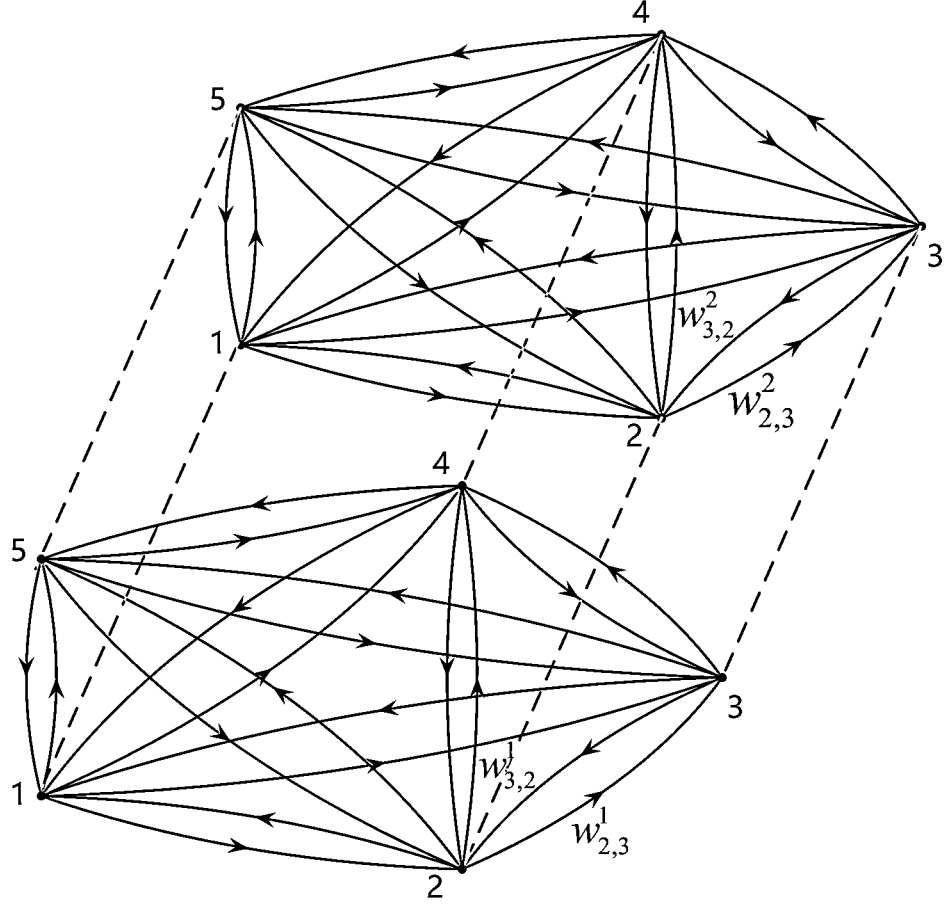

FIG. 1 is a schematic diagram of a multi-user directed graph in scheme a, where a lower diagram is a directed graph of a user 1 and an upper diagram is a directed graph of a user 2. FIG. 1 shows that in scheme a, each user shares the same initial directed graph node, however, as the optimal time slot interval $opt_u$ of each user is different, values of weights on directed edges each connecting two nodes in directed graphs of different users are different (for example, in FIG. 1, values of $$w_{2,3}^1$$

and $$w_{2,3}^2$$

as well as $$w_{3,2}^1$$

and $$w_{3,2}^2$$

are different).

Third step: selection of an edge in the directed and edge-weighted graph by the user u is represented by a binary variable $$x_{i,j}^u,$$

where $$x_{i,j}^u = 1$$

indicates that the user u uses an edge from the node i to the node j, otherwise $$x_{i,j}^u = 0.$$

Establishing an integer linear programming mathematical optimization model P1 is as follows:

$$\min \sum_{u=1}^{|U|} \sum_{i=1}^{m} \sum_{j=1}^{m} w_{i,j}^u \times x_{i,j}^u \qquad \text{P1}$$

1)

$$s.t. \sum_{j=1}^{m} x_{i,j}^u - \sum_{j=1}^{m} x_{j,i}^u = 0, \forall \, u \in U, \forall \, i \in S$$

2)

$$\sum_{u=1}^{|U|} \sum_{j=1}^{m} x_{i,j}^u \le 1, \forall \, i \in S$$

3)

$$\sum_{i=1}^{m} \sum_{j=1}^{m} x_{i,j}^u = k_u, \forall \, u \in U$$

An optimization objective in the above optimization model P1 is to minimize global sum of jitter of allocated time slot (where minimizing a sum of weights corresponding to path cycles with the definite quantity of edges in the directed graphs of all the users), a constraint condition 1) indicates that for a node on each directed and edge-weighted graph, the quantity of directed edges flowing into a node needs to be equal to the quantity of directed edges flowing out of the node. A constraint condition 2) indicates that a node in each directed and edge-weighted graph is allocated to at most one user, at most one edge flows out of the node, and meanwhile, at most one edge flows into the node. The constraint conditions 1) and 2) jointly limit that directed path cycles without coinciding nodes have to be allocated to each user. A constraint condition 3) is that the quantity of nodes allocated to the user meets a demand of the user for the quantity of time slots, which is represented in the directed graph by the quantity of nodes allocated to the user or the quantity of edges in the directed path cycle.

Fourth step: the established integer linear programming mathematical optimization model is solved by using a branch and bound method by means of a solver such as Mosek and Gurobi to obtain a globally optimal time slot allocation result.

Figure 2:
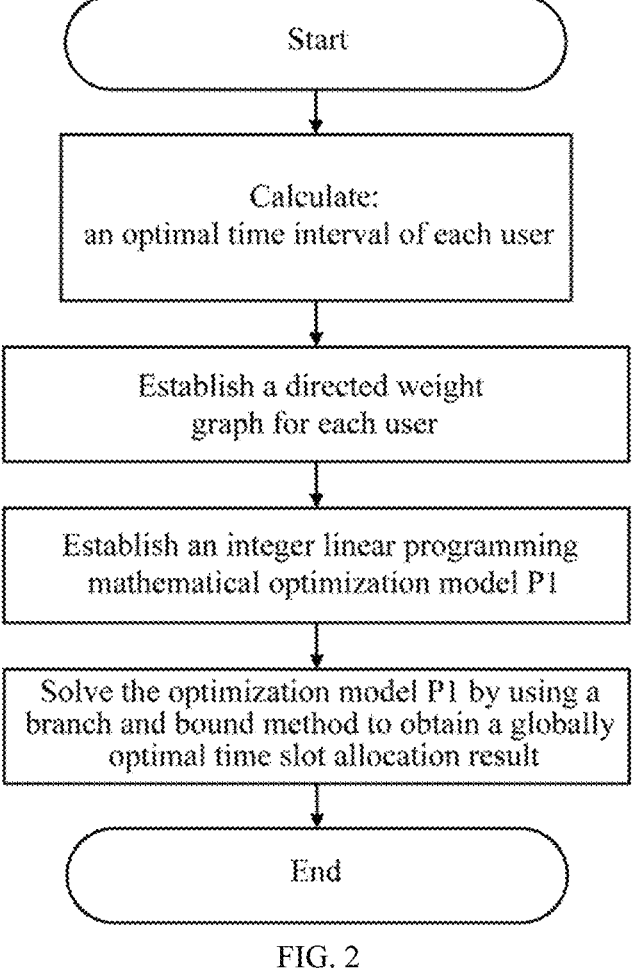

A block diagram of steps of a time slot allocation algorithm of a whole scheme a) is shown in FIG. 2.

Scheme b):

Scheme b) is given below, and in case of performing weighted sum of delay and jitter minimization based time slot allocation on each user according to the quantity of time slots required for the users in sequence from large to small on the premise of most user input data in the current time slot allocation period being transmitted in the current time slot allocation period, an algorithm executing process is as follows:

First step: a position (represented by $loc(P_i), \forall i=1, \ldots, k_u$) of an input time slot $P=\{P_1, \ldots, P_{k_u}\}$ of each user in the current time slot allocation period, a weight factor a with a delay minimization objective and a weight factor 1-a with a jitter minimization objective are obtained.

Second step: sequencing is performed according to the quantity of time slots required for each user (the quantity of time slots required for the $u^{th}$ user is represented by $k_u$) from large to small, and time slot allocation is performed on each user in sequence according to the sequence, where iteratively executing the following third step to ninth step on each user in sequence.

Third step: an optimal time slot interval $opt_u$ (representing an optimal time slot interval of the $u^{th}$ user) of each user is calculated according to the total quantity N of time slots in the current time slot allocation period and the quantity $k_u$ (representing the quantity of time slots required for the $u^{th}$ user) of time slots required for each user, where a specific calculation method is represented as follows:

$$opt_u = N / k_u$$

Delay between an $i^{th}$ input time slot and an $i^{th}$ output time slot (where an $i^{th}$ time slot allocated to the user) of the user is represented by ti, so in order to guarantee that jitter of the allocated time slots tends to be the minimum as much as possible and delay between the allocated time slot and a corresponding input time slot tends to be the minimum as much as possible, an optimal time slot allocation scheme needs to be figured out, so $D_i$ approaches $opt_u$ as much as possible, and a sum $$\sum_{i=1}^{k} t_i$$

of delays between the input time slot and the allocated time slot tends to be as small as possible. Therefore, an optimization objective may be represented by:

$$\min \sigma = (1-\alpha) \cdot \sum_{i=1}^{k_u} \frac{(D_1 - opt_u)^2}{opt_u} + \alpha \cdot \sum_{i=1}^{k_u} t_i$$

Fourth step: the quantity (represented by ntx) of input time slots of the current user u which are incapable of transmission in the current time slot allocation period is calculated, and an initial value of ntx is represented by ntx_ini, where specific sub-steps are as follows:

Step 4.1: a value of the quantity of input time slots of the current user u which are incapable of transmission in the current time slot allocation period is initialized, where ntx=0, a value of the quantity of input time slots of the current user u which are capable of transmission in the current time slot allocation period is initialized, where ctx=0, and an input time slot indicator variable of the current user u is initialized, where i=1.

Step 4.2: ntx=ntx+1 is set when a position of an $i^{th}$ last input time slot of the current user u in the current time slot allocation period is greater than a position of a $(ctx+1)^{th}$ last idle time slot in the current time slot allocation period.

ctx=ctx+1 is set when the position of the $i^{th}$ last input time slot of the current user u in the current time slot allocation period is less than or equal to a position of a $(ctx+1)^{th}$ last idle time slot in the current time slot allocation period.

Step 4.3: i=i+1 is set and step 4.2 is repeated till a value of i is greater than the quantity of time slots required for the current user u.

Step 4.4: a result of the quantity of input time slots of the current user u which are incapable of transmission in the current time slot allocation period is represented by ntx_ini, and ntx_ini=ntx is set.

Fifth step: the quantity of idle time slots in the current time slot allocation period is represented by m and an m×m adjacent matrix $Q^{(n)}$ is established, each element $$Q_{i,j}^{(n)}$$

representing a sum of weight on a shortest path containing n edges from nodes i to j.

Sixth step: a value of an element $$Q_{i,j}^{(1)}$$

in the adjacent matrix is calculated; a corresponding value of the adjacent matrix is set as a null value when i is equal to j; and when i is not equal to j, a value of ntx is 0 and a position of a first input time slot of the current user u in the current time slot allocation period is less than or equal to a position of the node i in the current time slot allocation period (where in case that $loc(P_1) \leq loc(i)$), a weight $w^u(i,j)$ (where an element value of an adjacent matrix $$Q_{i,j}^{(1)}$$

) of the two nodes i and j on a directed edge connecting the $u^{th}$ user may be calculated according to the following formula:

$$w_1^u(i, j) = \begin{cases} (1-\alpha) \times \dfrac{(loc(j) - loc(i) - opt_u)^2}{opt_u}, & \forall\ loc(i) \leq loc(j) \\[3mm] (1-\alpha) \times \dfrac{(loc(j) + N - loc(i) - opt_u)^2}{opt_u}, & \forall\ loc(i) > loc(j) \end{cases}$$

$$w_2^u(i, j) = \alpha \times (loc(i) - loc(P_1))$$

$$w^u(i, j) = w_1^u(i, j) + w_2^u(i, j)$$

Otherwise, a corresponding value of the adjacent matrix is set as a null value when the position of the first input time slot of the current user u in the current time slot allocation period is greater than the position of the node i in the current time slot allocation period (where $loc(P_1)>loc(i)$), where input and output time slots cannot match; and when i is not equal to j and a value of ntx is greater than 0, by using a position (where $loc(P_{k_u-ntx+1})$) of the $ntx^{th}$ last time slot of input time slots of the current user u, a path weight (where a value of an element $$Q_{i,j}^{(1)}$$

of the adjacent matrix) is calculated according to the following formula:

$$w_1^u(i,\,j) = \begin{cases} (1-\alpha) \times \dfrac{(loc(j) - loc(i) - opt_u)^2}{opt_u}, & \forall\ loc(i) \le loc(j) \\ (1-\alpha) \times \dfrac{(loc(j) + N - loc(i) - opt_u)^2}{opt_u}, & \forall\ loc(i) > loc(j) \end{cases}$$

$$w_2^u(i,\,j) = \alpha \times \left(N + loc(i) - loc\left(P_{k_u-ntx+1}\right)\right)$$

$$w^u(i,\,j) = w_1^u(i,\,j) + w_2^u(i,\,j)$$

ntx=ntx−1 is set.

Seventh step: an intermediate node q is selected, and in order to guarantee absence of a loop and repeating nodes, a position of the intermediate node q in the current time slot allocation period needs to be greater than a position of the node i in the current time slot allocation period (where $loc(q)>loc(i)$) and less than a position of the node j in the current time slot allocation period (where $loc(q)<loc(i)$). A value of an element $$Q_{i,j}^{(n)}$$

of the adjacent matrix in $n \in [2,\,k-1]$ is calculated respectively. The value of the element $$Q_{i,j}^{(n)}$$

of the adjacent matrix may be represented by a minimum value of a sum of weight on a shortest path $$Q_{i,q}^{(n-1)}$$

containing n−1 edges from the node i to the intermediate node q and a weight from the intermediate node q to the node j.

A value of $$Q_{i,j}^{(n)}$$

may be calculated through a dynamic programming method by using a value of $$Q_{i,q}^{(n-1)}$$

(a value of $$Q_{i,q}^{1}$$

may be obtained from sixth step) and a value of the weight from the intermediate node q to the node j. Specific substeps of calculating a value of the weight from the intermediate node q to the node j are as follows:

Step 7.1: q needs to meet $loc(P_n) \le loc(q)$, where a position of an allocated time slot needs to be greater than or equal to a position of an input time slot when a value of ntx_ini is 0, and the value of the weight from the intermediate node q to the node j is calculated according to the following formula:

$$w_1^u(q,\,j) = (1-\alpha) \times \frac{(loc(j) - loc(q) - opt_u)^2}{opt_u}$$

$$w_2^u(q,\,j) = \alpha \times (loc(q) - loc(P_n))$$

$$w^u(q,\,j) = w_1^u(q,\,j) + w_2^u(q,\,j)$$

When a value of ntx_ini is greater than 0 and the value of ntx is greater than 0, by using a position (where $loc(P_{k_u-ntx+1})$) of a $ntx^{th}$ last time slot of input time slots of the current user u, the value of the weight from the intermediate node q to the node j is calculated according to the following formula:

$$w_1^u(q,\,j) = (1-\alpha) \times \frac{(loc(j) - loc(q) - opt_u)^2}{opt_u}$$

$$w_2^u(q,\,j) = \alpha \times \left(N + loc(q) - loc\left(P_{k_u-ntx+1}\right)\right)$$

$$w^u(q,\,j) = w_1^u(q,\,j) + w_2^u(q,\,j)$$

ntx=ntx−1 is set.

Step 7.2: when a value of ntx_ini is greater than 0, the value of ntx is equal to 0 and a position of a time slot of the intermediate node q is greater than or equal to a position of a $(n\text{-}ntx\_ini)^{th}$ input time slot of the current user u (where $P_{n-ntx\_ini}$), by using the position of the $(n\text{-}ntx\_ini)^{th}$ input time slot of the current user u, the value of the weight from the intermediate node q to the node j is calculated according to the following formula:

$$w_1^u(q,\,j) = (1-\alpha) \times \frac{(loc(j) - loc(q) - opt_u)^2}{opt_u}$$

$$w_2^u(q,\,j) = \alpha \times (loc(q) - loc(P_{n-ntx\_ini}))$$

$$w^u(q,\,j) = w_1^u(q,\,j) + w_2^u(q,\,j)$$

Step 7.3: an m×m adjacent matrix $P^{(n)}$ is established and the intermediate node q p(n) passed through is recorded, where $$P_{i,j}^{(n)} = q$$

indicates that an n$^{th}$ hop from the node i to the node j passes through the node q, and meanwhile, values in $$P_{i,j}^{(1)}$$

are all null values.

Eighth step: in a case of n=k$_u$, an adjacent matrix $$Q_{i,j}^{(n)}$$

is calculated by adding $$Q_{i,q}^{(n-1)}$$

and $$Q_{q,i}^{(1)}, Q_{i,i}^{(n)}$$

A value of $$Q_{i,i}^{(n)}$$

is a weight of a shortest path passing through k$_u$ edges from the node i to return to the node i. Thus, a minimum diagonal element of $$Q_{i,i}^{(n)}$$

is a minimum total weight corresponding to a shortest path directed cycle without a loop by passing through k$_u$ edges from the node i to return to the node i; and through a value of an adjacent matrix P$^{(n)}$ corresponding to the minimum total weight, nodes through which the shortest path directed cycle passes are found and time slots corresponding to these nodes are allocated to the user u.

Ninth step: the quantity of idle time slots in the current time slot allocation period and positions of idle time slots in the current time slot allocation period are updated.

Figure 3:
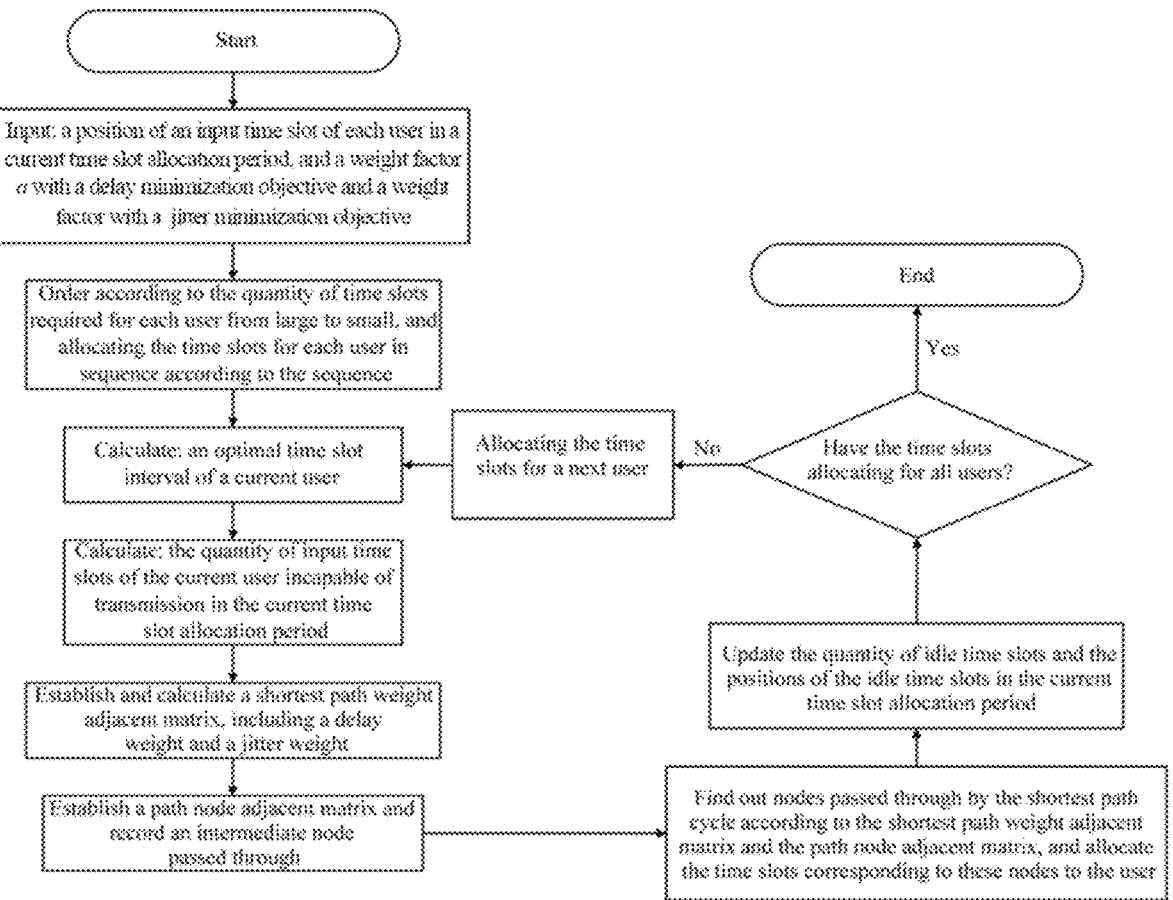
FIG. 3 is a block diagram of steps of a time slot allocation algorithm of a whole scheme b.

A block diagram of steps of a time slot allocation algorithm of a whole scheme b is shown in FIG. 3.

Figure 4:
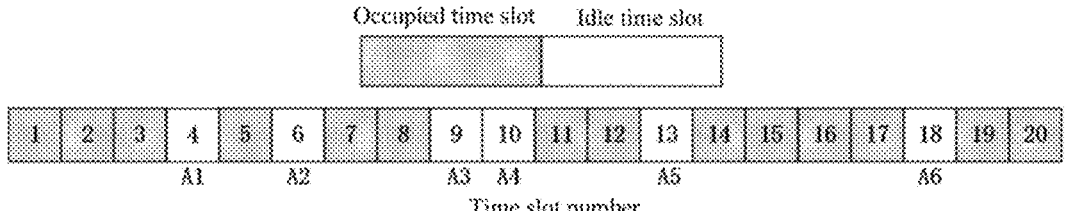
FIG. 4 is a schematic diagram of time slot numbers and idle time slot positions.

FIG. 4 is a schematic diagram of time slot numbers and idle time slot positions. There are a total of 20 time slots in the example, marked as 1, 2, 3, . . . , 20 respectively. Positions of idle time slots are 4, 6, 9, 10, 13, 18, and other time slots are occupied time slots.

Figure 5:
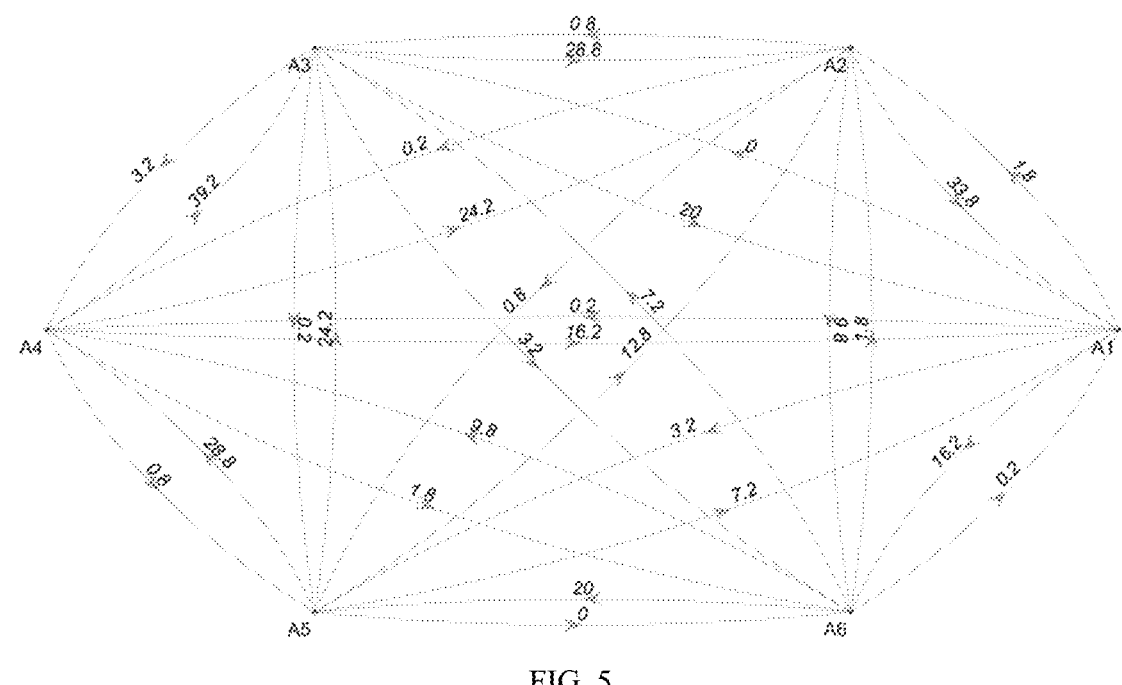
FIG. 5 is a schematic diagram of a directed graph.

FIG. 5 is a schematic diagram of a directed graph. In order to establish the directed graph, the idle time slots in FIG. 4 are marked as A1, A2, . . . , A6 respectively. Numerals on the directed edge connected with nodes in the directed graph represent corresponding edge weight values.

Figure 6:
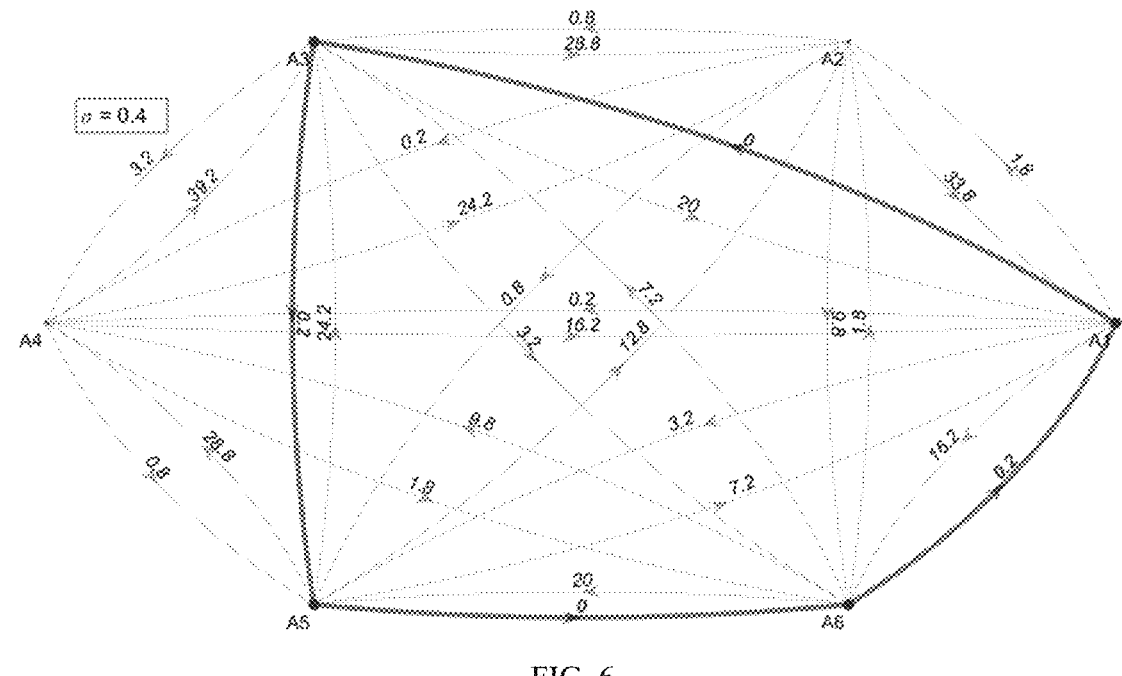
FIG. 6 is a schematic diagram of a shortest path directed cycle.

FIG. 6 is a schematic diagram of a shortest path directed cycle. If in the example, the user needs four time slots, the shortest path directed cycle containing four edges in the directed graph is shown by a thickened path in FIG. 6, and a sum of edge weight values corresponding to the path is 0.4.

Figure 7:
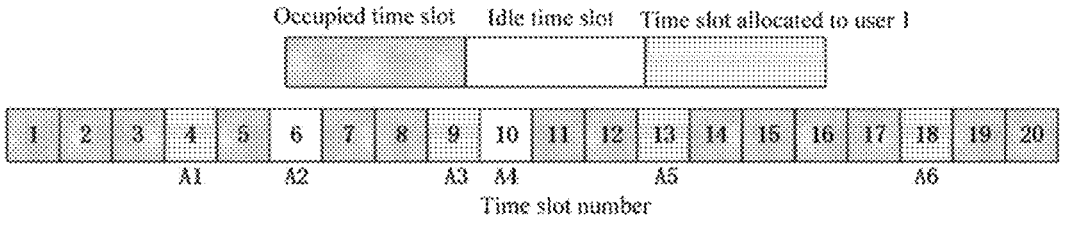
FIG. 7 is a schematic diagram of a time slot allocation result.

FIG. 7 is a schematic diagram of a time slot allocation result. Nodes through which the shortest path directed cycle passes in FIG. 6 correspond to a diagram of time slot positions, where a result of the time slot allocated finally to the user is obtained.

Time Slot Allocation Result of Scheme a

Embodiment 1: it is assumed that there are a total of 50 time slots, represented by {1, . . . , 50}, the number of idle time slots is 12, and positions of the idle time slots are 6, 9, 10, 11, 17, 24, 29, 30, 34, 37, 38 and 46. Time slot allocation needs to be performed for two users, where user 1 needs six time slots, and user 2 needs four time slots.

The result of allocating the time slots on user 1 and user 2 are as follows, respectively: the time slots allocated to user 1 are 6, 17, 24, 30, 38 and 46, and the time slots allocated signed to user 2 are 9, 11, 29 and 37. A value of an objective function of user 1 (where a sum of jitter of allocated time slot, or a sum of weights on edges corresponding to the shortest path directed cycle in the directed graph of user 1) is calculated as 2.08, and a value of an objective function of user 2 is 20.08. Thus, a value of a total objective function is 22.16.

Global sum of jitter of allocated time slot is minimized by using scheme a, and an obtained result is: time slots allocated to user 1 are 6, 11, 24, 30, 37 and 46, and time slots allocated to user 2 are 9, 17, 29 and 38. A value of an objective function of user 1 is calculated as 5.2, and a value of an objective function of user 2 is 8.4. Thus, a value of a total objective function is 13.6.

Figure 8:
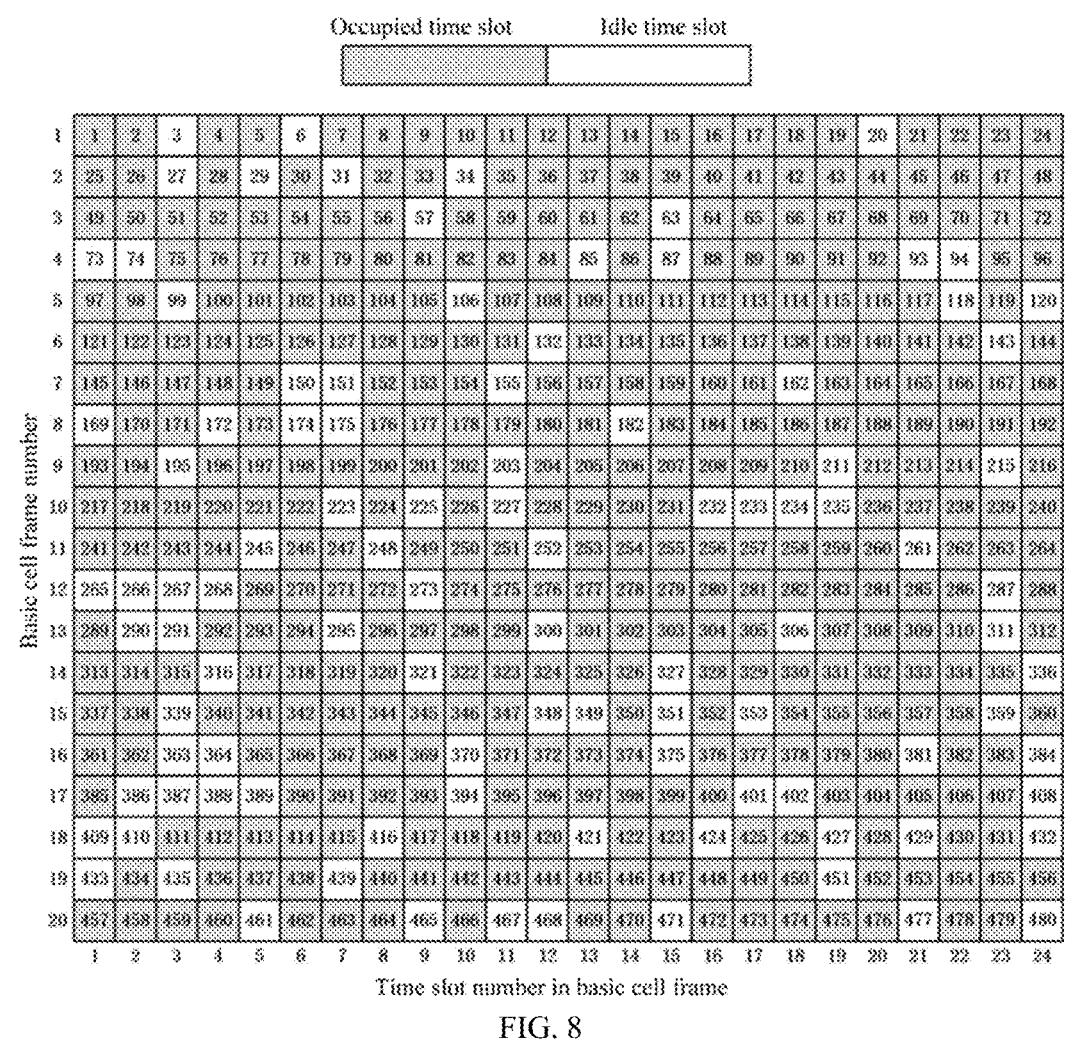

Embodiment 2: for an allocation scheme with the total quantity 480 of time slots, 100 idle time slots are generated randomly, and distribution of positions of the idle time slots is shown in FIG. 8. Time slots need to be allocated to four users, and a time slot required for each user is 10, 15, 20 and 25, respectively. A value of a total objective function obtained from an allocation result through a globally optimal scheme (where scheme a) is 43.4167. A value of a total objective function obtained from a scheme of allocating to each user in sequence is 62.3958.

The above embodiments 1 and 2 show that scheme a can effectively reduce network global sum of jitter of allocated time slot, thereby improving resource allocation equity and improve whole performance of a network.

Time Slot Allocation Result of Scheme b

Figure 9:
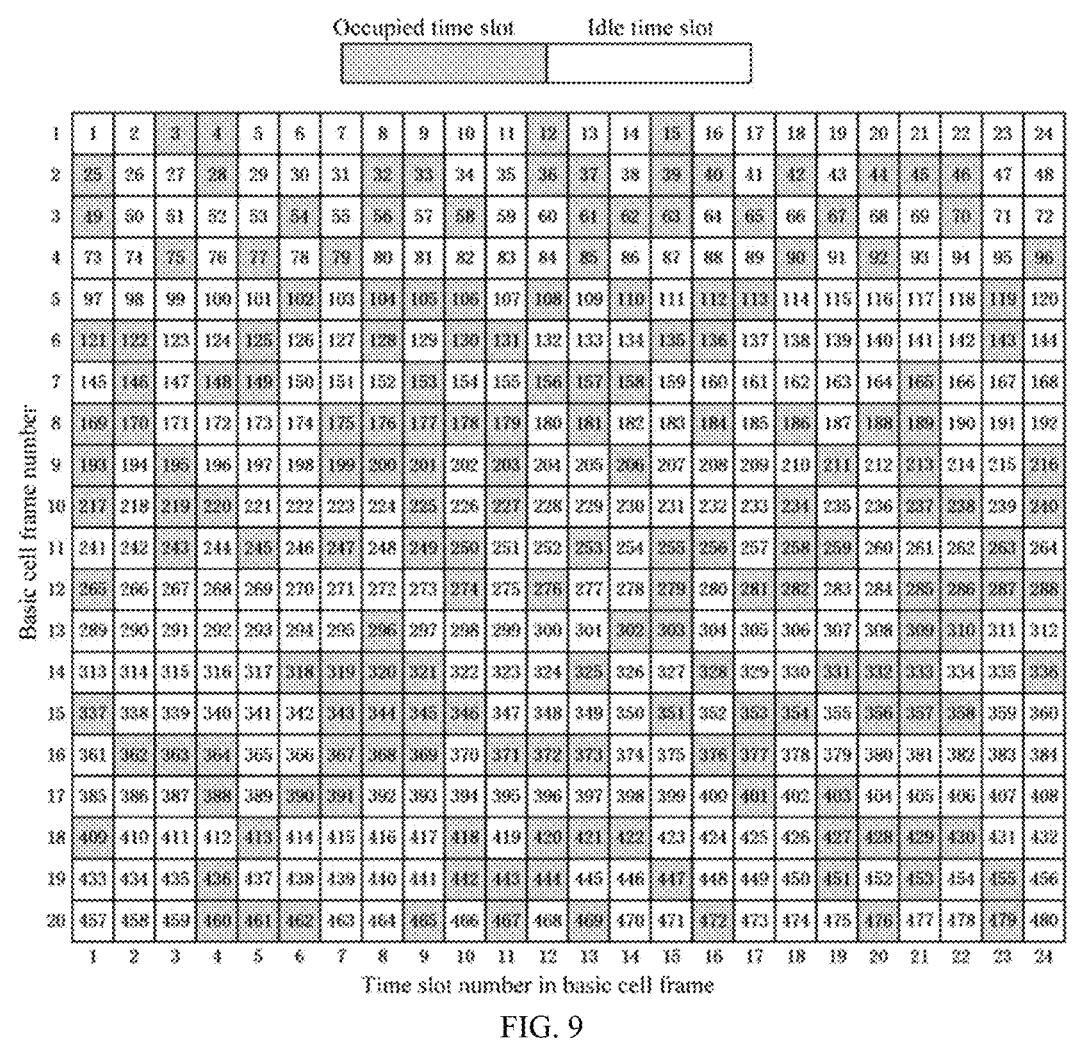

For a resource allocation situation of scheme b, first, a time slot allocation priority is set according to time slots required for the user from large to small, where idle time slots are first allocated to a user needing more time slots. The total quantity of time slots is set as 480, where 300 idle time slots are generated randomly, as shown in FIG. 9. There are 10 users, and the quantities of time slots required for all users are arranged from large to small to be respectively: 40, 35, 30, 25, 20, 15, 10, 10, 10 and 5. Besides, each user randomly generates the corresponding quantity (1 to 480) of input time slots, specifically as follows:

Input time slots of user 1 are: 23 37 39 41 49 60 67 71 84 93 100 108 118 125 184 190 195 196 215 291 298 311 330 332 338 344 383 393 407 419 420 425 428 433 448 461 462 464 468 478.

Input time slots of user 2 are: 3 15 75 91 93 98 109 132 175 194 195 196 199 201 208 210 245 249 260 265 283 314 335 347 352 362 374 385 395 423 424 426 428 468 474.

Input time slots of user 3 are: 9 18 27 31 35 37 40 45 98 101 134 155 185 219 224 245 255 282 303 307 324 328 357 402 421 459 461 464 466 480.

Input time slots of user 4 are: 30 36 53 63 71 92 118 152 153 200 215 244 277 298 318 353 359 367 372 382 385 392 456 469 478.

Input time slots of user 5 are: 5 47 75 153 156 170 192 214 228 317 331 372 389 415 416 420 430 438 439 460.

Input time slots of user 6 are: 55 57 79 127 159 261 264 286 295 313 361 371 372 382 411.

Input time slots of user 7 are: 87 91 123 128 249 260 337 377 415 440.

Input time slots of user 8 are: 43 44 72 108 162 204 230 266 299 326.

Input time slots of user 9 are: 29 121 130 235 242 259 265 332 343 477.

Input time slots of user 10 are: 123 182 266 268 307.

FIG. 10 is a diagram of a relationship among user ensemble average jitter, delay and a delay weight in scheme b. A result in FIG. 10 shows that the time slot allocation scheme b can reach effective balance according to a set weight factor on delay between a sum of jitter and a sum of delay of allocated time slot, meet diversified transmission demands of different users and achieve the purpose of flexibly, rapidly and dynamically adjusting, allocating and deploying network time slot resources according to the current network state and the user demands.

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components (e.g., op amp circuit integrator as part of the heat flux data module) that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The foregoing descriptions are merely preferred embodiments of the present disclosure, but are not intended to limit the present disclosure. Any modification, equivalent replacement, or improvement or the like made within the spirit and principle of the present disclosure should fall within the protection scope of the present disclosure.

What is claimed is:

1. A multi-user flexible Ethernet fine granularity time slot allocation method, comprising:

step S1: obtaining a current network state of flexible Ethernet (FlexE), comprising a total quantity of time slots, a quantity of idle time slots and positions of idle time slots in a current time slot allocation period;

step S2: obtaining a user demand, comprising a quantity of users requiring time slots to be allocated and a quantity of time slots required for each user;

step S3: allocating time slots for the users according to the current network state and the user demand, wherein the users have two selective time slot allocation schemes as follows:

step S3a: jitter minimization based time slot allocation, comprising allocating the time slots based only on an objective of global minimization of jitter of time slot allocated to all the users, without requiring a delay of the allocated time slots, and step S3b: weighted sum of delay and jitter minimization based time slot allocation for each user in a sequence of the quantity of time slots required for the users from large to small, when most user input data in the current time slot allocation period are transmitted in the current time slot allocation period; and step S4: performing time slot configuration by the FlexE according to a time slot allocation result of the user, wherein said step S3a jitter minimization based time slot allocation in the step S3 further comprises:

step S31a: calculating an optimal time slot interval of each user, respectively, according to the total quantity of time slots in the current time slot allocation period and the quantity of time slots required for each user, wherein an optimal time slot interval of an user is calculated by dividing the total quantity of time slots by the quantity of time slots required for the user, and wherein $opt_u$ represents a result of a $u^{th}$ user;

step S32a: establishing a directed and edge-weighted graph for each user, respectively, according to the quantity of idle time slots and the positions of idle time slots in the current time slot allocation period and the optimal time slot interval of each user, wherein each node in the directed and edge-weighted graph represents one idle time slot, x represents a node, and loc(x) represents a position of the idle time slot corresponding to the node in the current time slot allocation period, and wherein a weight on a directed edge connecting two nodes is calculated as follows:

when a position loc(j) of an idle time slot corresponding to an inflow node j connected with the directed edge in the current time slot allocation period is greater than or equal to a position loc(i) of an idle time slot corresponding to an outflow node i connected with the directed edge in the current time slot allocation period, namely loc(j)≥loc(i), the weight on the directed edge is obtained by subtracting the position loc(i) of the idle time slot corresponding to the outflow node i connected with the directed edge in the current time slot allocation period and an optimal time slot interval $opt_u$ of the user from the position loc(j) of the idle time slot corresponding to the inflow node j connected with the directed edge in the current time slot allocation period, and dividing a square of an obtained subtracting result by the optimal time slot interval $opt_u$ of the user, mathematically represented by $(loc(j)-loc(i)-opt_u)^2/opt_u$; and when the position loc(j) of the idle time slot correspond-
ing to the inflow node j connected with the directed
edge in the current time slot allocation period is less
than the position loc(i) of the idle time slot correspond-
ing to the outflow node i connected with the directed
edge in the current time slot allocation period, namely
loc(j)<loc(i), the weight on the directed edge is
obtained by adding the position loc(j) of the idle time
slot corresponding to the inflow node j connected with
the directed edge in the current time slot allocation
period to a total quantity N of time slots in the current
time slot allocation period, subtracting the position
loc(i) of the idle time slot corresponding to the outflow
node i connected with the directed edge in the current
time slot allocation period and the optimal time slot
interval optu of the user, and dividing a square of an
obtained subtracting result by the optimal time slot
interval $opt_u$ of the user, mathematically represented by
$(loc(j)+N-loc(i)-opt_u)^2/opt_u$;

step S33a: establishing an integer linear programming
mathematical optimization model in combination with
three constraint conditions with minimizing global sum
of jitter of allocated time slot as an objective, namely
minimizing a sum of weights corresponding to path
cycles of a definite quantity of edges in directed graphs
of all users, wherein the three constraint conditions
comprises:

condition (1) a quantity of directed edges flowing into a
node on each directed and edge-weighted graph is
equal to a quantity of directed edges flowing out of the
node;

condition (2) a node in each directed and edge-weighted
graph is allocated to at most one user, at most one edge
flows out of the node, and meanwhile, at most one edge
flows into the node; and condition (3) a quantity of nodes allocated to the user
meets a demand of the user for the quantity of time
slots; and step S34a: solving the established integer linear program-
ming mathematical optimization model by using a
branch and bound method to obtain a globally optimal
time slot allocation result.

2. The multi-user flexible Ethernet fine granularity time
slot allocation method according to claim 1, wherein said the
step S3b weighted sum of delay and jitter minimization
based time slot allocation for each user in a sequence of the
quantity of time slots required for the users from large to
small, on premise of most user input data in the current time
slot allocation period being transmitted in the current time
slot allocation period, comprising:

step S31b: obtaining a position of an input time slot of
each user in the current time slot allocation period, and
a weight factor a with a delay minimization objective
and a weight factor 1−a with a jitter minimization
objective;

step S32b: ordering according to the quantity of time slots
required for the users from large to small, and allocat-
ing the time slots for each user in sequence according
to the sequence, namely iteratively executing the fol-
lowing step S33b to step S39b for each user in
sequence;

step S33b: calculating an optimal time slot interval of the
current user u according to the total quantity of time
slots in the current time slot allocation period and the
quantity of time slots required for a current user u,
wherein the optimal time slot interval of the current
user u is calculated by dividing the total quantity of time slots by the quantity of time slots required for the
current user u, wherein $opt_u$ represents a result of the $u^{th}$
user;

step S34b: calculating a quantity of input time slots of the
current user u incapable of transmission in the current
time slot allocation period, represented by ntx, wherein
ntx_ini represents an initial value of ntx;

step S35b: establishing an m×m adjacent matrix $Q^{(n)}$,
wherein m represents the quantity of idle time slots in
the current time slot allocation period, and each ele-
ment $$Q_{i,j}^{(n)}$$

in the adjacent matrix $Q^{(n)}$ represents a sum of weight
on a shortest path comprising n edges from nodes i to
j;

step S36b: calculating a value of an adjacent matrix $$Q_{i,j}^{(1)}$$

as follows:

when i is equal to j, setting a corresponding value of the
adjacent matrix as a null value;

when i is not equal to j, a value of ntx is 0, and a position
$loc(P_1)$ of a first input time slot of the current user u in
the current time slot allocation period is less than or
equal to a position of the node i in the current time slot
allocation period, calculating a path weight, namely an
element value of the adjacent matrix $$Q_{i,j}^{(1)},$$

according to a weight calculation method in case of
being capable of transmission in the current time slot
allocation period, and when i is not equal to j, the value
of ntx is 0, and, the position $loc(P_1)$ of the first input
time slot of the current user u in the current time slot
allocation period is greater than the position of the node
i in the current time slot allocation period, that is, input
and output time slots are not matched with each other,
setting a corresponding element value of the adjacent
matrix as a null value; and when i is not equal to j and the value of ntx is greater than
0, calculating the path weight, namely the element
value of the adjacent matrix $$Q_{i,j}^{(1)},$$

and setting ntx=ntx−1, according to the weight calcu-
lation method in case of being incapable of transmis-
sion in the current time slot allocation period by using
a position $loc(P_{k_u-ntx+1})$ of a $ntx^{th}$ last time slot of input
time slots of the current user u;

step S37b: selecting an intermediate node q, wherein a
position of the intermediate node q in the current time
slot allocation period is greater than the position of the
node i in the current time slot allocation period, and smaller than a position of the node j in the current time slot allocation period; calculating an adjacent matrix $$Q_{i,j}^{(n)}$$

when a value of n is from 2 to the quantity $k_u$ of time slots required for the current user u minus 1, wherein an element of the adjacent matrix $$Q_{i,j}^{(n)}$$

means a minimum value of a sum of weight on a shortest path $$Q_{i,q}^{(n-1)}$$

containing (n−1) edges from the node i to the intermediate node q and a weight from the intermediate node q to the node j;

step S38b: when the value of n is the quantity $k_u$ of time slots required for the current user u, calculating the adjacent matrix $$Q_{i,i}^{(n)}$$

by adding $$Q_{i,q}^{(n-1)} \text{ and } Q_{q,i}^{(1)},$$

wherein a minimum diagonal element of $$Q_{i,i}^{(n)}$$

is a minimum total weight corresponding to a shortest path directed cycle, without a loop, of passing through $k_u$ edges from the node i to return to the node i;

step S39b: finding out nodes passed through by the shortest path directed cycle, by a value of an adjacent matrix $P^{(n)}$ corresponding to the minimum total weight obtained in the step S38b, and allocating the time slots corresponding to the nodes passed through by the shortest path directed cycle to the user u; and step S40b: updating the quantity and the positions of idle time slots in the current time slot allocation period.

3. The multi-user flexible Ethernet fine granularity time slot allocation method according to claim 2, wherein said calculating the quantity of input time slots of the current user u incapable of transmission in the current time slot allocation period in the step S34b further comprises:

step S34b1: initializing a value of the quantity of input time slots of the current user u incapable of transmission in the current time slot allocation period, where ntx=0, a value of the quantity of input time slots of the current user u capable of transmission in the current time slot allocation period, where ctx=0, and an input time slot indicator variable of the current user u, where i=1;

step S34b2: setting ntx=ntx+1 when a position of an $i^{th}$ last input time slot of the current user u in the current time slot allocation period is greater than a position of a $(ctx+1)^{th}$ last idle time slot in the current time slot allocation period; and setting ctx=ctx+1 when the position of the $i^{th}$ last input time slot of the current user u in the current time slot allocation period is less than or equal to the position of the $(ctx+1)^{th}$ last idle time slot in the current time slot allocation period; and step S34b3: setting i=i+1, and repeating the step S34b2 until a value of i is greater than the quantity of time slots required for the current user u.

4. The multi-user flexible Ethernet fine granularity time slot allocation method according to claim 2, wherein a value of the weight from the intermediate node q to the node j in the step S37b is calculated as follows:

step S37b1: when a value of ntx_ini is equal to 0 and a position of a time slot of the intermediate node q is greater than or equal to a position loc($P_n$) of a time slot of an $n^{th}$ input of the current user u, calculating the value of the weight from the intermediate node q to the node j according to the calculation method capable of transmission in the current time slot allocation period;

when the value of ntx_ini is greater than 0 and the value of ntx is greater than 0, calculating the value of the weight from the intermediate node q to the node j according to the calculation method incapable of transmission in the current time slot allocation period by a position loc($P_{k_u-ntx+1}$) of a ntx$^{th}$ last time slot of input time slots of the current user u and setting ntx=ntx−1; and when the value of ntx_ini is greater than 0, the value of ntx is equal to 0 and the position of a time slot of the intermediate node q is greater than or equal to a position of a time slot of a $(n-ntx\_ini)^{th}$ input of the current user u, calculating the value of the weight from the intermediate node q to the node j according to the calculation method capable of transmission in the current time slot allocation period by using a position loc($P_{n-ntx\_ini}$) of a $(n-ntx\_ini)^{th}$ input time slot of the current user u; and step S37b2: establishing an m×m adjacent matrix $P^{(n)}$, and recording the intermediate node q passed through by the m×m adjacent matrix $P^{(n)}$, wherein $$P_{i,j}^{(n)} = q$$

indicates that an $n^{th}$ hop from the node i to the node j passes through the node q, and values in $$P_{i,j}^{(1)}$$

are all null values.

5. The multi-user flexible Ethernet fine granularity time slot allocation method according to claim 2, wherein the weight calculation method in case of being incapable of transmission in the current time slot allocation period in the step S36b comprises:

step s101: calculating a jitter weight;

wherein x represents a node loc(x) represents a position of an idle time slot corresponding to the node in the current time slot allocation period, and a jitter weight on a directed edge connecting two nodes is calculated as follows:

when a position loc(j) of an idle time slot corresponding to an inflow node j connected with the directed edge in the current time slot allocation period is greater than or equal to a position loc(i) of an idle time slot corresponding to an outflow node i connected with the directed edge in the current time slot allocation period, namely loc(j)≥loc(i), a weight on the directed edge is obtained by subtracting the position loc(i) of the idle time slot corresponding to the outflow node i connected with the directed edge in the current time slot allocation period and an optimal time slot interval $opt_u$ of the user from the position loc(j) of the idle time slot corresponding to the inflow node j in the current time slot allocation period, dividing a square of an obtained subtracting result by the optimal time slot interval $opt_u$ of the user, and multiplying by the weight factor 1−a with the jitter minimization objective, mathematically represented by $(1-a)\times(loc(j)-loc(i)-opt_u)^2/opt_u$; and when the position loc(j) of the idle time slot corresponding to the inflow node j connected with the directed edge in the current time slot allocation period is less than the position loc(i) of the idle time slot corresponding to the outflow node i connected with the directed edge in the current time slot allocation period, namely loc(j)<loc(i), the weight on the directed edge is obtained by adding the position loc(j) of the idle time slot corresponding to the inflow node j in the current time slot allocation period to a total quantity N of time slots in the current time slot allocation period, subtracting the position loc(i) of the idle time slot corresponding to the outflow node i connected with the directed edge in the current time slot allocation period and the optimal time slot interval $opt_u$ of the user, dividing a square of an obtained subtracting result by the optimal time slot interval $opt_u$ of the user, and multiplying by the weight factor 1−a with the jitter minimization objective, mathematically represented by $(1-a)\times(loc(j)+N-loc(i)-opt_u)^2/opt_u$;

step s102: calculating a delay weight, comprising:

adding a position of an idle time slot corresponding to a current outflow node i in the current time slot allocation period to the total quantity N of time slots in the current time slot allocation period, subtracting a position of a current input time slot of the current user u in the current time slot allocation period, and multiplying an obtained subtracting result by the weight factor a with the delay minimization objective; and step s103: calculating a total weight, namely adding the jitter weight calculated in the step s101 and the delay weight calculated in the step s102.

6. The multi-user flexible Ethernet fine granularity time slot allocation method according to claim 4, wherein the weight calculation method in case of being capable of transmission in the current time slot allocation period in the step S36b and the step S37b comprises:

step s201: calculating a jitter weight;

wherein x represents a node, loc(x) represents a position of an idle time slot corresponding to the node in the current time slot allocation period, and a jitter weight on a directed edge connecting two nodes is calculated as follows:

when a position loc(j) of an idle time slot corresponding to an inflow node j connected with the directed edge in the current time slot allocation period is greater than or equal to a position loc(i) of an idle time slot corresponding to an outflow node i connected with the directed edge in the current time slot allocation period, namely loc(j)≥loc(i), a weight on the directed edge is obtained by subtracting the position loc(i) of the idle time slot corresponding to the outflow node i connected with the directed edge in the current time slot allocation period and an optimal time slot interval $opt_u$ of the user from the position loc(j) of the idle time slot corresponding to the inflow node j in the current time slot allocation period, dividing a square of an obtained subtracting result by the optimal time slot interval $opt_u$ of the user, and multiplying by a weight factor 1−a with a jitter minimization objective, mathematically represented by $(1-a)\times(loc(j)-loc(i)-opt_u)^2/opt_u$; and when the position loc(j) of the idle time slot corresponding to the inflow node j connected with the directed edge in the current time slot allocation period is less than the position loc(i) of the idle time slot corresponding to the outflow node i connected with the directed edge in the current time slot allocation period, where loc(j)<loc(i), the weight on the directed edge is obtained by adding the position loc(j) of the idle time slot corresponding to the inflow node j in the current time slot allocation period to the total quantity N of time slots in the current time slot allocation period, subtracting the position loc(i) of the idle time slot corresponding to the outflow node i connected with the directed edge in the current time slot allocation period and the optimal time slot interval $opt_u$ of the user, dividing a square of an obtained subtracting result by the optimal time slot interval $opt_u$ of the user, and multiplying by the weight factor 1−a with the jitter minimization objective, mathematically represented by $(1-a)\times(loc(j)+N-loc(i)-opt_u)^2/opt_u$;

step s202: calculating a delay weight, comprising:

subtracting a position of a current input time slot of the current user u in the current time slot allocation period from a position of an idle time slot corresponding to a current outflow node in the current time slot allocation period, and multiplying an obtained subtracting result by a weight factor a with the delay minimization objective; and step s203: calculating a total weight, namely adding the jitter weight calculated in the step s201 and the delay weight calculated in the step s202.

7. A multi-user flexible Ethernet fine granularity time slot allocation apparatus, configured to implement the multi-user flexible Ethernet fine granularity time slot allocation method according to claim 1.

8. An electronic device, comprising:

one or more processors; and a storage apparatus, configured to store one or more programs, wherein the one or more programs, when executed by the electronic device, cause the electronic device to implement the multi-user flexible Ethernet fine granularity time slot allocation method according to claim 1.

9. A computer-readable storage medium on which a program is stored, wherein the program, when executed by a processor, is configured to implement the multi-user flexible Ethernet fine granularity time slot allocation method according to claim 1.

* * * * *